Jan. 21, 1964      W. L. CRESAP      3,118,504

METHOD FOR CONTROL OF ROTARY WING AIRCRAFT

Filed Feb. 13, 1961      4 Sheets-Sheet 1

INVENTOR
WESLEY L. CRESAP

BY John Gibson Semmes

ATTORNEY

Jan. 21, 1964     W. L. CRESAP     3,118,504
METHOD FOR CONTROL OF ROTARY WING AIRCRAFT
Filed Feb. 13, 1961     4 Sheets-Sheet 3

INVENTOR
WESLEY L. CRESAP
BY John Gibson Semmes
ATTORNEY

Jan. 21, 1964   W. L. CRESAP   3,118,504
METHOD FOR CONTROL OF ROTARY WING AIRCRAFT
Filed Feb. 13, 1961   4 Sheets-Sheet 4

INVENTOR
WESLEY L. CRESAP
BY John Gibson Semmes
ATTORNEY

United States Patent Office 3,118,504
Patented Jan. 21, 1964

3,118,504
METHOD FOR CONTROL OF ROTARY WING AIRCRAFT
Wesley L. Cresap, Fort Worth, Tex., assignor to Bell Aerospace Corporation, Wheatfield, N.Y., a corporation of Delaware
Filed Feb. 13, 1961, Ser. No. 88,962
12 Claims. (Cl. 170—160.25)

The present invention relates to improving operation characteristics of rotors, particularly method and means for improving operational characteristics of non-articulated rotors in rotary wing aircraft.

Today's operational helicopters all, to some degree, utilize what is known as an articulated rotor. The articulation, in many configurations, consists of two hinges near the mast connecting the rotor blades to a rotor hub member. If the hinges are not "real," they are in the form of "virtual" hinges, whereby a connecting member is constructed to have sufficient flexibility to allow the rotor blades to move as if a real hinge were in operation. One hinge is approximately horizontal (i.e. perpendicular to the mast) and provides the means for what is commonly known in the art as "flapping." The principal purpose of this horizontal flapping hinge in the helicopter is to relieve beamwise (perpendicular to the plane of rotation) stresses that would develop in the blade and hub. A second hinge is approximately vertical (i.e. approximately parallel to the mast) and provides for lead and leg motion of the blades in their plane of rotation. The principal purpose of the vertical hinge is to relieve stresses that would develop in the plane of rotation of the rotor blades from air forces acting on the blades and the Coriolis effect, which takes place generally when a driven member is rotating in a plane at an angle to the driving member, as, for example, the inclined plane of the rotor to the mast when the blades are flapping about the horizontal hinge.

In contrast to rotor systems which use two hinges on each blade and are known as "fully articulated" rotors, there is a single, flapping hinge system known as a "semi-rigid" system, where the in-plane rotor stresses are accommodated by means other than the lead-lag hinge.

Early helicopter pioneers experimented with what is known as a rigid rotor system, that is non-articulated, in which the connection between the blades and the mast does not include a hinge, either real or virtual, to permit blade flapping or lead-lag motion to any substantial degree. While successful flights were achieved, high rotor stresses of the early rigid rotor systems, were not overcome sufficiently to permit operational use of rigid rotors, and the articulated, or hinged rotor, came into general use.

The articulated rotor helicopter possesses an operational characteristic best described as a "lag." The pilot operates the control stick and some short but distinct time thereafter the rotor has tilted and transmitted a moment acting around the center of gravity of the helicopter. The result of this time lag is a tendency for the pilot to over-control, for he must learn that the movement of the helicopter will lag behind his control motion. This makes learning to pilot a helicopter somewhat difficult, requiring considerable training and practice.

Another characteristic of the articulated rotor is the relatively small moment that can be applied to the fuselage. This moment, with the articulated rotor, is caused by the thrust from the tilted rotor acting at a distance from the center of gravity of the helicopter. Additional moments can be created by placing the flapping articulation at some distance from the mast, whereupon, in addition to the thrust vector acting around the center of gravity, the centrifugal force in the blades of the inclined rotor acts to apply a moment to the mast. But, in either case, the moment capacity of the articulated rotor is relatively small and presents an important subject for consideration. This factor restricts the helicopter designer in his choice of configuration. In the single rotor helicopter he must provide for the center of gravity to be close to the mast, thus inhibiting freedom of choice as to position of engine and equipment. In addition, this factor limits the nature and extent of the aircraft loading pattern and restricts certain flight conditions.

Additionally, articulation in the area of attachment of the blades to the mast requires a complex structure in a dynamic portion of the rotor system that is operating under high loads.

Accordingly, among other things, the present invention is concerned with overcoming the aforementioned deficiencies present in today's operational helicopters.

According to the present invention, the rotor is fixedly mounted on the mast and the mast is itself gimballed to the fuselage. Thus, the conventional articulated mounting between the blades and the mast is moved from the highly loaded portion of the dynamic system to a relatively lightly loaded portion of the drive system or, as in the specific embodiment described herein, to a non-rotating portion. This rigid rotor mounting permits elimination of a considerable number of rotor parts, resulting in a simple, lightweight design. Operational kinematics are improved since high rotor torque is not required to be transmitted around an angle, as is the case with present systems whenever the rotor is not square with the mast.

Accordingly, it is an object of the present invention to improve operational kinematics in helicopter rotor systems.

Another object is to permit the use of a shorter helicopter mast.

Another object is to provide means for varying the sensitivity of helicopter rotor control.

Another object of invention is to provide an improved helicopter pylon suspension system which enables transmittal of greater moments to the fuselage.

Another object of the invention is to provide means to trim the fuselage to any desired flight attitude. This permits minimization of drag, optimization of comfort, is particularly suited to enable high speed helicopter flight, and would be of obvious advantage on a helicopter-wing combination.

Other objects and advantages of the invention will be readily apparent from the following detailed description when taken together with the accompanying drawings which are views of a pylon support system and control system constructed according to the present invention.

Figure 1:
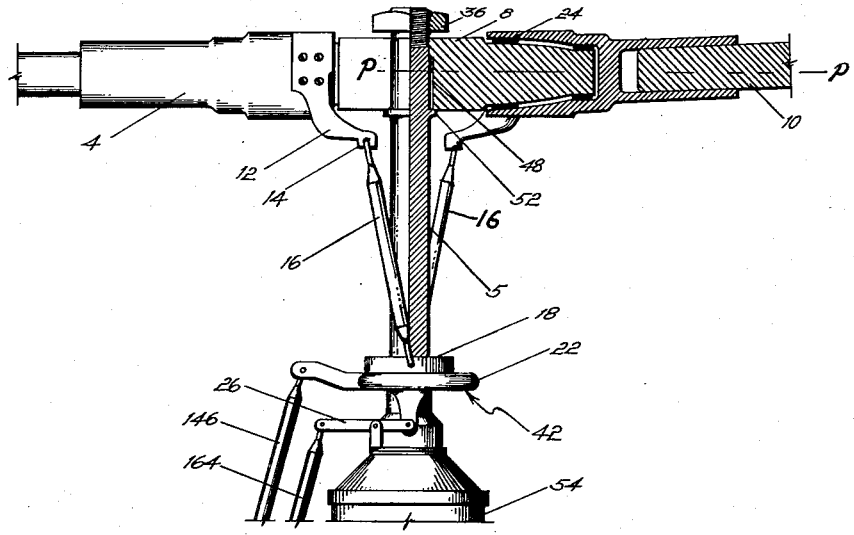
FIG. 1 illustrates the attachment of the rotor to the mast.

In FIG. 1, the blade grip 4 is supported on trunnion 8, the axis of which is directed along the longitudinal axis of rotor blade 10. Pitch horn 12 is bolted to the blade grip 4 and extends radially away from the axis of the trunnion 8, to attach at 14 to the control rod 16. The control rod 16 attaches to the rotating member 18 of the swashplate 42, in a manner well known in the art, to effect cyclic pitch control and collective pitch control through rotation of the blade grip 4 and blade 10 around the bearings 24 and trunnion 8. The details of the swashplate 42, collective lever 26, control rods 16, attachments of the swashplate 42 to the mast 5, and those other features necessary for cyclic and collective pitch control, are omitted, these conventional features being well known and capable of many variations which will not limit the contribution of this invention.

As heretofore noted, the trunnion 8 is fixedly attached to the mast 5 by means of mast spline 48, and is held in position by means of nut 36 which threads on the mast 5 and clamps the trunnion 8 against the mast shoulder 52. With the exception of such inherent flexibility as may be present in the rotor blade and attaching parts, there is no articulation between the rotor blade 10 and the mast 5, thus constituting what is commonly referred to in the art as a rigid rotor.

Figure 2:
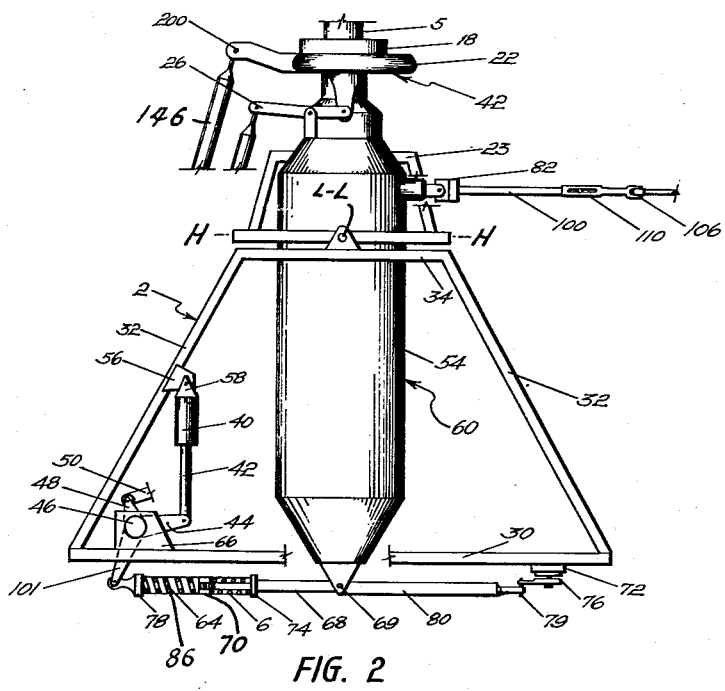
FIG. 2 shows a side view of the mounting of the pylon to the fuselage based structure.

As shown in FIGURES 1 and 2, the mast 5 extends from the engine-transmission casing 54 which is shown to be an integral part of the pylon system 60. This specific type of construction, wherein the engine and transmission are integrated into the pylon system is described in U.S. Patent No. 2,615,657 but does not constitute a part of this invention and is not a necessary condition for this invention. The mast 5 and the engine-transmission casing 54, and the attachments to the mast as previously noted, including the swashplate 42, and all necessarily related parts, constitute the pylon assembly 60.

Figure 6:
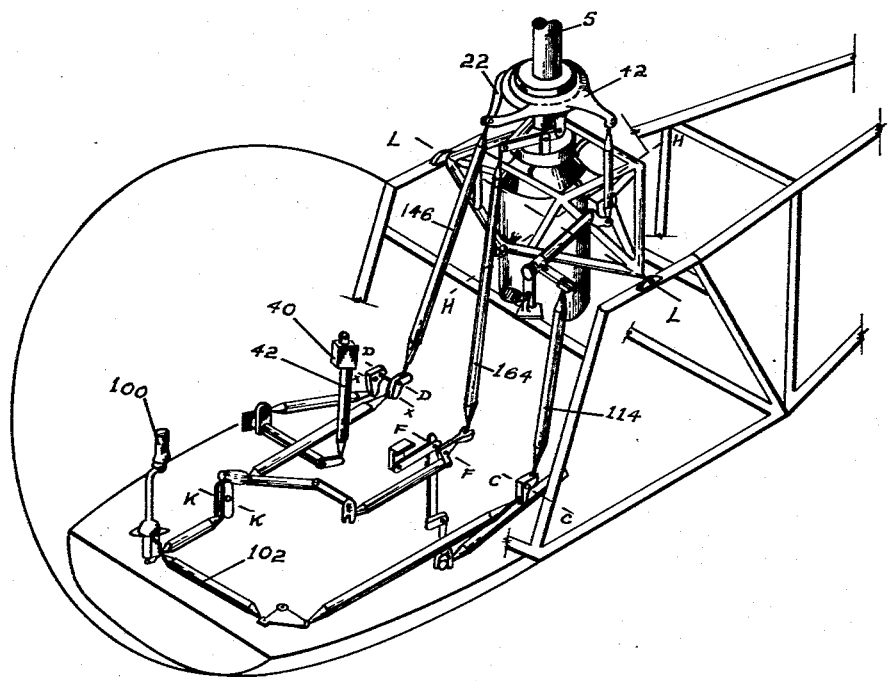
FIG. 6 is a perspective view showing the assemblage of FIG. 3 mounted within a helicopter frame.
Figure 5:
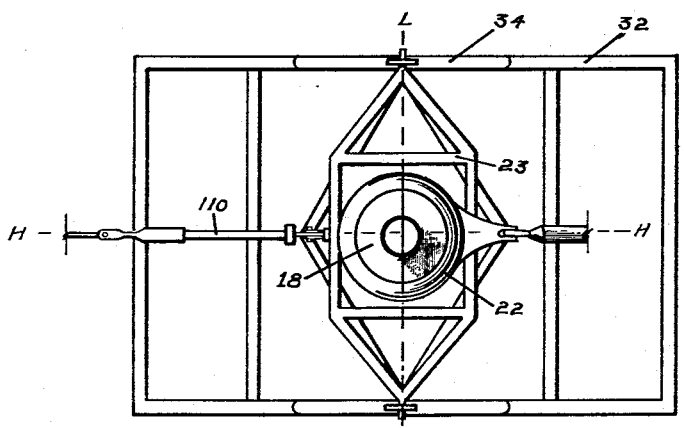
FIG. 5 is a top plan of the mounting of FIG. 2.

As shown in FIGS. 2 and 6, pylon assembly 60 is universally mounted on the mount assembly 2 by means of frame 23. Pylon assembly 60 pivots around axis H—H with relation to frame 23, while frame 23 pivots around axis L—L with relation to mount assembly 2.

Mount assembly 2 comprises tubes 30, 32, and 34 welded together to form a structural unit. The tubes 30, only one of which is shown, are connected to the helicopter fuselage (not shown) and hold mount assembly 2 fixed in relation to the helicopter fuselage.

Rotary damper 72 is supported on tube 30. Lever 76 splines on to rod 80 at point 79. The other end of rod 80 attaches to the lower end of pylon assembly 60 at point 69. Also attaching to the lower end of pylon assembly 60 is rod 68 which extends within the aligner assembly 6 threading into flange 70. Springs 64 butt against opposite sides of flange 70 and against caps 74 and 78 which thread on to the ends of cylinder 86. Cap 78 attaches to lever 101 which is rigidly attached to torque tube 46. Lug 66 is welded to the mounting tube 30 and provides support for the torque tube 46. Another lever 44 extends from torque tube 46 and engages rod 42. Rod 42 is an extension of the shaft of actuator 40 which is mounted on lug 56, welded to mounting tube 32.

Figure 3:
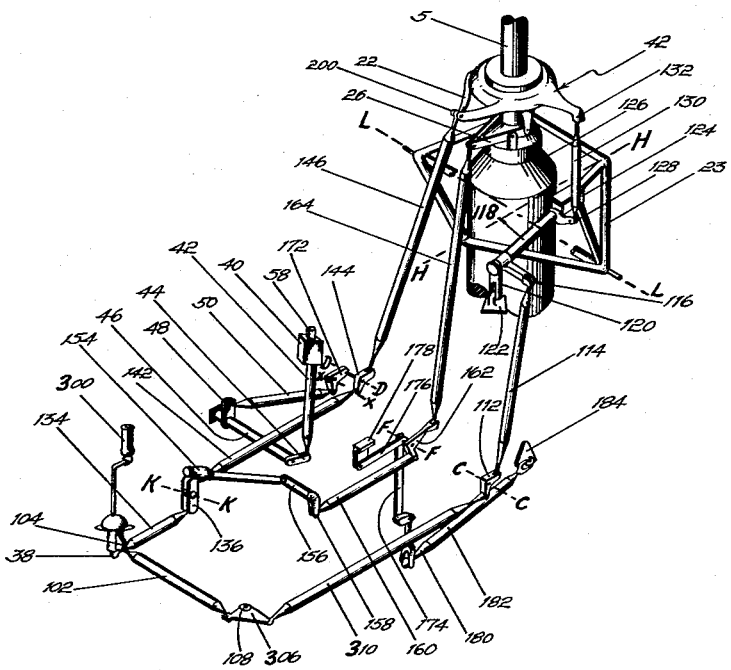
FIG. 3 shows, in perspective, the flight controls for cyclic and collective pitch from the control sticks to the swashplate, and the "trim" and "decoupling" systems.

Also attached to torque tube 46 is lever 48 as can be seen in FIGURES 2 and 3. Rod 50 (FIG. 3) attaches at one end to lever 48 and at the other end to an arm of bellcrank 172 which pivots along axis X—X. The other arm of bellcrank 172 supports bellcrank 144 along pivot axis D—D, thus providing a reference point for the cyclic control system as will be hereinafter discussed.

Referring to FIG. 2, the tail rotor drive 100 extends rearwardly from the engine-transmission casing 54 through universal coupling 82, shaft 100, sliding spline 110 and universal coupling 106. The sliding spline 110 permits compensation for the forward or rearward motion of the engine-transmission casing 54 upon tilting of the pylon assembly, and, together with the universal couplings 82 and 106, allows for misalignments in construction.

Figure 7:
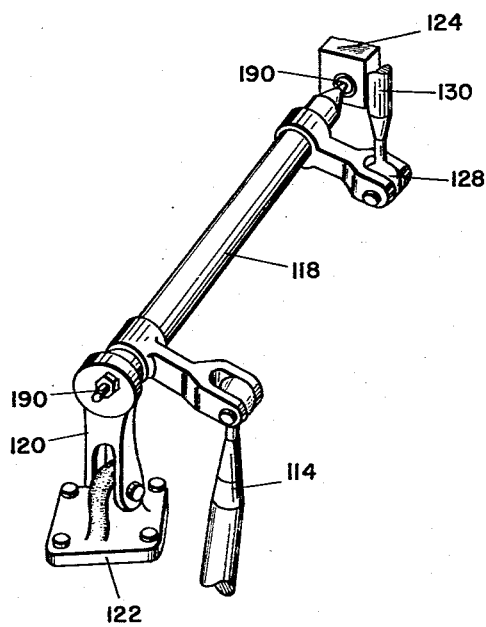
FIG. 7 is an enlarged view of a portion of FIGS. 3 and 6.

The cyclic stick 300 (FIG. 3) is universally mounted on the cabin floor (not illustrated). A tube 102 attaches to the cyclic stick at 104 and extends laterally to bellcrank 306 which is pivoted to the fuselage at 108. At the other end of bellcrank 306 is tube 310 extending to bellcrank 112 pivoted along axis C—C. Control tube 114 extends from bellcrank 112 up to lever 116 which is connected to torque tube 118. Torque tube 118 is supported on one end by fuselage-based lever 120 pivoted on lug 122. As shown in more detail in FIG. 7, torque tube 118 is supported at one end by ball joint 190 mounted in lever 120 and at the other end by ball joint 190 mounted in lug 124 which is attached to the frame 23. Lever 128 is attached to torque tube 118 and to control tube 130 which extends upwardly to connect to swashplate 42 and 132. As lug 22 is fuselage based and lug 124 is mounted on the bracket 23, pivoting of the rotor and pylon assembly around axis L—L will cause the torque tube 118 to misalign with respect to lever 120 and lug 124. This misalignment is permitted by ball joints 190.

Attaching to the cyclic stick 300 at point 38 and extending rearwardly is a control tube 134 attached to reversing lever 136. Attached to the other end of reversing lever 136 is control tube 142 which extends rearwardly to the bellcrank 144 pivoted on axis D—D. Control tube 146 reaches upwardly from bellcrank 144 attaching to the nonrotating portion 22 of the swashplate 42 at 200.

Rod 50 (also shown on FIG. 2 and described with reference thereto) attaches at one end to lever 48 and at the other end to bellcrank 172 which is fuselage-based along axis X—X. One arm of bellcrank 172 supports bellcrank 144 along axis D—D.

The collective pitch lever 154 connects to torque tube 156. Lever 158 is rigidly attached to torque tube 156 and attaches to rod 160 which extends rearwardly to pivot on one end of bellcrank 162 which is supported on axis F—F. The other end of bellcrank 162 attaches to rod 164 which attaches to the collective pitch lever 26 as shown.

Rods 174 and 176 are pivoted along axis F—F in common with bellcrank 162. Rod 176 is pivoted at its other end on fuselage-based lug 178. Rod 174 connects to bellcrank 180 which attaches to rod 182. Rod 182 attaches to lug 184 mounted at the bottom of pylon assembly 60 in a manner similar to the attachment to the bottom of pylon assembly 60 shown in FIG. 2.

The function and purpose of the described mechanisms can best be appreciated by consideration of a typical flight of the helicopter. For example, to initiate forward flight, the pilot pushes the cyclic stick 100 forward. Pushing the cyclic stick forward would, through the appropriate controls shown in FIGURES 1 and 3, cause the swashplate 42 to tilt relative to mast 5, thereby imparting to rotor blades 10 a cyclic motion around pitch change axis P—P in accord with established and well known principles. The rotor built in accordance with this invention will tilt in space in response to the applied cyclic pitch and will, because of the nature of the rigid attachments of the blade 10 to the mast 5 carry the mast 5 and pylon system 60 with it.

When the rotor and pylon system 60 tilt in space, the degree and speed in which the helicopter fuselage follows this tilt will depend upon the strength of the springs 64 of the aligner assembly 6 (FIG. 2).

A rigid rotor, as heretofore noted, has an unusually high moment capability. While this moment capability is always present, the moment that will be developed by the rotor is necessarily limited to the restraint upon which the rotor can act. With respect to maneuvering in the air, inertial and aerodynamic forces determine the restraint that will be presented to the rotor. But, as the rotor moment is transmitted through the spring 64 in aligner assembly 6, then, necessarily, the strength of the springs 64 effectively determines the maximum moment that can be transmitted from the rotor to the fuselage. It is anticipated that spring strength will be such that inertia and aerodynamic forces developed in normal maneuvering will not cause substantial spring displacement, thus resulting in a relatively rapid fuselage response to control by the pilot.

It is also anticipated that the selection of the spring strength will be based primarily on the required extreme position of the center of gravity of the helicopter. The extreme positions of the center of gravity also determine the moment that must be developed by the rotor. For example, with an extreme rearward position of the center of gravity the rotor must impose an equal and opposite forward moment upon the mast to maintain position. Additional forward moments will act to incline the rotor and effect translation of the helicopter.

In addition to the matter of aerodynamic and inertia forces for maneuvering, and location of the center of gravity relative to the mast for position, there is also the moment in translation caused by the effective center of pressure on the entire helicopter acting at a distance from the center of gravity of the entire helicopter. All of these forces can be additive but the substantially greater proportion of restraint will be provided by the extreme location of the center of gravity relative to the mast.

If the helicopter is considered based on the ground, then the restraint will depend primarily upon the landing gear configuration. In general, the restraint on the ground will be substantially greater than that possible in flight. Consequently, to protect the structural integrity of a helicopter of the type herein disclosed, a device can be incorporated to couple pylon tilt relative to the fuselage with cyclic pitch, so that relative motion of the pylon to the fuselage caused by cyclic pitch control, will cause a reduction of cyclic pitch. In this manner the moment imposed by the rotor on the ground will be limited to that capable of being transmitted in flight, determined by the springs of the aligner assembly and thus ensuring the structural integrity of the various helicopter components.

Reference to FIG. 3 will indicate the manner in which this coupling of cyclic pitch and pylon tilt can be effected. First, consider that the pylon is tilted longitudinally around axis L—L relative to the fuselage. Point 200 which is the attachment from rod 146 to the non-rotating portion 22 of swashplate 42 will tend to remain stationary, being held in position by the pilot holding the cyclic stick. Thus, ordinarily, a forward tilt of the pylon will cause rearward tilt of the swashplate relative to the mast.

It is obvious that a forward movement of the cyclic stick could restore the swashplate to its original position relative to the mast. If the two events, the rearward tilt of the swashplate resulting from pylon tilt and the forward tilt of the swashplate caused by the controls, take place simultaneously, then the swashplate can maintain its original position with respect to the mast. In actual operation of course, the sequence of events takes place effectively simultaneously although in reverse to that discussed above; the pilot will first operate the cyclic pitch stick, the cyclic pitch will cause the rotor and pylon to tilt and the coupling of the cyclic pitch with pylon tilt will "wash out" the pilot-applied cyclic pitch.

The "wash-out" of cyclic pitch by coupling of cyclic pitch to pylon tilt may be desired to be totally effective or partially effective, dependent upon the particular configuration to which this invention is applied. It is a simple matter to properly arrange the kinematics of the system to accomplish any degree of coupling.

When the pilot desires to "trim" the attitude of the helicopter for a certain flight condition, he energizes the actuator 40 shown on FIGURES 2 and 3. Dependent upon the direction in which the pilot wishes to move the fuselage with respect to the pylon, the actuator rod 42 will retract or extend thus pulling or pushing against lever 44 attached to torque tube 46 as heretofore noted. We may consider the pylon and rotor fixed in space, as the attitude of the rotor in space will, basically, determine the speed of the helicopter. With this in mind, we can examine what happens to the fuselage in a "trim" operation. When the actuator 40 is energized, the rod 42 is extended or retracted, pushing or pulling on lever 44, which then acts through torque tube 46, lever 48, rod 50 and bellcrank 172. Bellcrank 172 serves as the support for bellcrank 144 along axis D—D. The pilot is holding the cyclic stick 100 and therefore holding the pilot's side of bellcrank 144 in a position fixed with respect to the fuselage. The lever 101 (FIG. 2) that is attached to torque tube 46 and shown extending downwardly pushes against the spring 64 of aligner assembly 6 and, through the spring 64, against the bottom of the pylon assembly 60. As we are considering the pylon and rotor fixed in space, and noting that the trim system is based at one end on the bottom of the pylon assembly 60 and at the other end on the fuselage (point 58), it will be appreciated that energization of the actuator will tilt the fuselage with respect to the pylon. In this instance (trim) however, it will not be desirable to couple the cyclic pitch with pylon tilt as is desired when the pylon tilts in response to a cyclic pitch command. While the pilot might be able to adjust for some coupling during trim operation, it is more desirable that the mechanism provide for relatively no, or minimal, coupling upon trim of the fuselage. The embodiment described in FIGURE 3 achieves this in the following manner. If we again consider the pylon and rotor fixed in space, it is clear that as the actuator 40 is energized to extend rod 42 for the purpose of trimming, and torque tube 46 rotates, the lever 48 will also rotate causing the tube 50 to actuate bellcrank 172 which will cause axis D—D to translate upwardly. Considering the influence of tube 142 which attaches to one arm of bellcrank 144 and bellcrank 136 pivoted along axis K—K, the point of attachment between bellcrank 144 and rod 146 will move upwardly and will tilt the swashplate 42 up at point 200 with respect to the mast. However, it is noted that simultaneously the actuator 40 has been causing the fuselage to rotate counter clockwise (FIG. 2) with respect to the mast. All that remains is to arrange the kinematics of the system so that these two opposite motions are equal, and the fuselage attitude can be trimmed with no cyclic coupling, allowing fuselage attitude to be selected independently of rotor attitude.

The collective pitch is also decoupled from pylon tilt in similar fashion by means of lug 178, rods 176 and 174, bellcrank 180, rod 182, and lug 184 and the manner in which these elements connect to the collective pitch system as shown in FIG. 3.

It will be appreciated that the most desirable degree of tilting freedom permitted around axes H—H and L—L will depend upon the specific configuration under consideration and may vary considerably. Such axes may be real or virtual and can have different degrees of tilting freedom in the longitudinal and lateral direction, or can virtually eliminate this freedom along one axis, depending upon the loading pattern of the configuration. Also, restraints may be incorporated within such axes as, for example, rubber mounting of the pylon to the fuselage which could supply both the tilting freedom and the spring restraint.

The degree of spring restraint, can, of course, vary from springs, or equivalents, with no pre-loading and low spring constants to those with high preloading and high spring constants.

As with any dynamic system it may be desirable to apply damping in various degrees.

The tilt of the pylon or mast with respect to the fuselage can also be accomplished by attaching a flexible mast fixedly to the fuselage. The flexure or bending of the mast will provide the equivalent of the pivotal attachment of the mast or pylon to the fuselage. With this type of structure, wherein a flexible mast is used, if the swashplate is based either on the fuselage or on the relatively non-bending portion of the mast, then the coupling of cyclic pitch to mast tilt will take place between the attachment to the blade pitch horn and the swashplate. It is clear that such a coupling will be influenced by the position of the attachment point to the pitch horn relative to the mast. Considering an articulated rotor which has its flapping pivot on the mast, this relationship would be defined as delta, causing change in pitch with flapping. Of course with a rigid rotor the delta effect as such is not present, but, in the case in point, that of a rigid rotor on a flexible mast, the relationship of the pitch horn attachment point to the mast will be significant in establishing the degree of cyclic pitch coupling with mast tilt.

Figure 4:
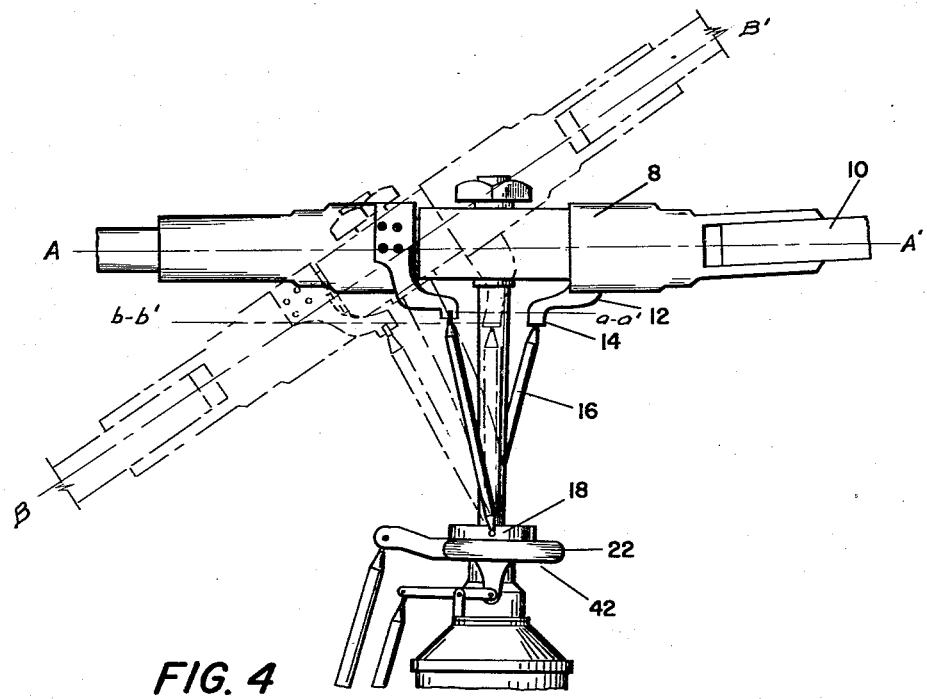
FIG. 4 is a side view of an embodiment of the invention employing a flexible mast.

FIG. 4, which is similar to FIG. 1 except that the mast is relatively flexible, illustrates the coupling of cyclic pitch with mast flexion. When the plane of rotation of the attachment points 14 between pitch horns 12 and rods 16 is parallel to the plane of rotation of the rotor 8, then it is clear that there is no cyclic pitch being introduced to the rotor blades. When the plane of rotation of the attachment points 14 is at an angle to the plane of rotation of the rotor 8, it should be also clear that cyclic pitch is being introduced to the rotor blades. Considering FIG. 1, the plane of rotation of attachment points 14 is parallel to the plane of rotor rotation, meaning no cyclic pitch. If the swashplate 42 were to be tilted then the plane of rotation of attachment points 14 would necessarily follow the plane of rotation of the swashplate, being connected thereto by rods 16, and would rotate at an angle to the rotor plane indicating that cyclic pitch is being introduced to the rotor blades. Considering FIG. 4 in the full line position wherein rotor plane A—A' is parallel to attachment point plane a—a', there is no cyclic pitch in the rotor. However, when the mast is deflected as indicated by the broken line portion of FIG. 4, with the swashplate based on the relatively non-deflecting portion of the mast, the result is, as illustrated, that the plane of rotation of attachment points 14 is at an angle to the resultant plane of rotation A—A' of the rotor and there is cyclic pitch introduced in the rotor. Thus mast flexion has been coupled with cyclic pitch.

Manifestly, various other means may be adopted for coupling mast tilt to cyclic pitch control without departing from the spirit and scope of invention as defined in the subjoined claims.

I claim:

1. A method for control of a rigid-rotor rotary wing aircraft comprising actuating cyclic pitch control, tilting the rotor mast with respect to the fuselage in response to cyclic pitch control, and changing the amount of rotor cyclic pitch in response to the tilting of said mast.

2. The method according to claim 1, including damping tilt of said mast.

3. The method according to claim 1, including partially restraining movement between said mast and said fuselage.

4. A rotary wing aircraft comprising a fuselage, a mast pivoted to said fuselage, a rotor attached to said mast, cyclic pitch control means connected to said rotor, interconnecting linkage between said mast and said cyclic control means such that upon tilting of said mast with respect to the fuselage cyclic pitch in the rotor changes to create moments on the mast in opposition to said tilting of the mast.

5. A rotary wing aircraft as in claim 4, including a trim actuator mounted on said fuselage and extending between said mast and said fuselage, said actuator including a drive means capable of positioning said fuselage with respect to said mast.

6. A rotary wing aircraft comprising a fuselage, a flexible mast attached to said fuselage, a rotor fixedly attached to said mast, cyclic pitch control means connected to said rotor, interconnecting linkage between said mast and said cyclic pitch control means, said linkage upon bending of said flexible mast moving said cyclic pitch control and, accordingly, changing cyclic pitch in the rotor to create moments in the mast in opposition to said bending of the mast.

7. A rotary wing aircraft comprising a fuselage, a mast pivoted to said fuselage, a rotor attached to said mast, a swashplate supported upon said mast, pilot control means connected to said swash-plate and cyclic control linkage interconnecting said pilot control means, said mast and said rotor, said linkage upon tilting of said mast with respect to said fuselage, tilting said swashplate with respect to said fuselage to a lesser amount than said mast tilts with respect to said fuselage.

8. A rotary wing aircraft as in claim 7, including flexibly resistive means interposed between said mast and said fuselage.

9. A rotary wing aircraft as in claim 7, including damping means interposed between said mast and said fuselage.

10. A rotary wing aircraft comprising a fuselage, a pilot cyclic pitch control means attached to said fuselage, a mast pivotally attached to said fuselage, a rotor attached to said mast and linked to said cyclic control means, an actuator interposed between said mast and said fuselage, said actuator including a drive means capable of positioning said fuselage with respect to said mast, linkage interconnecting said actuator and said cyclic pitch control means, said linkage pivoting upon positioning of the fuselage with respect to the mast by the actuator drive means to the extent that there is no extensive change in the cyclic pitch in the rotor nor in the position of the pilot cyclic control means with respect to the fuselage.

11. A rotary wing aircraft comprising a tiltable pylon assembly attached to the fuselage of said aircraft, a mast supported in said pylon assembly, a rigid rotor attached to said mast, pitch control means abutting said mast and connected to said rotor, said pitch control means being coupled to pylon tilt and selective flexible restraining means interposed between said fuselage and said pylon.

12. A rotary wing aircraft comprising a tiltable mast attached to the fuselage of said aircraft, a rotor fixedly attached to said mast, cyclic pitch and collective pitch control means connected to said rotor and abutting said mast, said cyclic pitch control means being pivotable by said mast and, accordingly, changing cyclic pitch of said rotor upon tilt of the mast with respect to the fuselage, said collective pitch being substantially unchanged upon tilt of said mast with respect to said fuselage.

References Cited in the file of this patent

UNITED STATES PATENTS

| 2,418,407 | Hays | Apr. 1, 1947 |
| 2,739,769 | Rogers | Mar. 27, 1956 |